United States Patent
Caputo et al.

(10) Patent No.: US 11,629,225 B2
(45) Date of Patent: Apr. 18, 2023

(54) PROCESSES FOR PRODUCING AROMATIC DIAMINE-INITIATED POLYETHER POLYOLS

(71) Applicants: Covestro LLC, Pittsburgh, PA (US); Covestro Deutschland AG, Leverkusen (DE)

(72) Inventors: Jenna L. Caputo, Carnegie, PA (US); Anthony R. Loveday, Weirton, WV (US); Edward P. Browne, Cologne (DE)

(73) Assignees: Covestro LLC, Pittsburgh, PA (US); Covestro Deutschland AG, Leverkusen (DE)

( * ) Notice: Subject to any disclaimer, the term of this patent is extended or adjusted under 35 U.S.C. 154(b) by 437 days.

(21) Appl. No.: 16/883,243

(22) Filed: May 26, 2020

(65) Prior Publication Data

US 2021/0371586 A1    Dec. 2, 2021

(51) Int. Cl.
*C08G 65/26* (2006.01)
*C08G 18/50* (2006.01)

(52) U.S. Cl.
CPC ..... *C08G 65/2627* (2013.01); *C08G 18/5021* (2013.01); *C08G 65/2648* (2013.01); *C08G 2110/0025* (2021.01); *C08G 2650/36* (2013.01)

(58) Field of Classification Search
None
See application file for complete search history.

(56) References Cited

U.S. PATENT DOCUMENTS

| | | | |
|---|---|---|---|
| 4,209,609 A | 6/1980 | Haas | |
| 4,243,759 A | 1/1981 | Haas | |
| 4,391,728 A | 7/1983 | Korczak et al. | |
| 4,397,966 A | 8/1983 | Stolz et al. | |
| 4,421,871 A | 12/1983 | Korczak et al. | |
| 4,469,822 A | 9/1984 | Stolz et al. | |
| 4,562,290 A | 12/1985 | Korczak et al. | |
| 4,743,628 A | 5/1988 | Conkey et al. | |
| 5,030,758 A | 7/1991 | Dietrich et al. | |
| 5,141,968 A | 8/1992 | Dietrich et al. | |
| 5,786,405 A | 7/1998 | Schilling et al. | |
| 5,840,781 A | 11/1998 | Dietrich et al. | |
| 6,339,110 B1 | 1/2002 | Cappella et al. | |
| 6,762,214 B1 | 7/2004 | Tracy et al. | |
| 7,691,913 B2 | 4/2010 | Moore et al. | |
| 8,618,337 B2 | 12/2013 | Fricke et al. | |
| 10,752,731 B2 | 8/2020 | Grosse-Willerich et al. | |
| 2003/0119930 A1* | 6/2003 | Adkins | C08G 18/5063 528/425 |
| 2005/0004403 A1 | 1/2005 | Guttes et al. | |
| 2010/0036010 A1* | 2/2010 | Morley | C08G 18/5027 564/505 |
| 2010/0261870 A1 | 10/2010 | Loeffler et al. | |
| 2011/0263742 A1* | 10/2011 | Zarbakhsh | C07C 213/04 568/606 |

FOREIGN PATENT DOCUMENTS

| | | |
|---|---|---|
| DE | 4232970 A1 | 4/1994 |
| GB | 1311095 A | 3/1973 |
| WO | WO 9947581 A1 | 9/1999 |
| WO | WO 2011134866 A2 | 11/2011 |

* cited by examiner

*Primary Examiner* — Christopher M Rodd
(74) *Attorney, Agent, or Firm* — Donald R. Palladino

(57) ABSTRACT

Processes are described for producing an aromatic diamine-initiated polyether polyol having a measured OH number of 300 to 500 mg KOH/g and a viscosity at 25° C. of 5000 to 50,000 mPas. The processes include a first alkoxylation step in which an alkylene oxide consisting essentially of propylene oxide is reacted with a starter consisting essentially of aromatic diamine at a molar ratio of propylene oxide to aromatic diamine of 1.4:1 to 2.0:1 to form an alkoxylated product; and a second alkoxylation step in which an alkylene oxide consisting essentially of propylene oxide is reacted with the alkoxylated product, in the presence of an added catalyst, until the ratio of moles of propylene oxide added in the process to the moles of aromatic diamine added in the process is 4:1 to 9:1.

20 Claims, 2 Drawing Sheets

PROCESSES FOR PRODUCING AROMATIC DIAMINE-INITIATED POLYETHER POLYOLS

FIELD

The present invention relates to the production of aromatic diamine-initiated polyether polyols, as well as to the use of such polyols in the manufacture of polyurethane foams.

BACKGROUND

Aromatic diamine, such as ortho-toluene diamine ("o-TDA"), based polyether polyols are often manufactured by propoxylating the diamine in a first step in the absence of a catalyst ("PO1 step"). The PO1 step often occurs at a temperature of, for example, 130-150° C. During the PO1 step, nitrogen groups on the diamine are propoxylated, which has historically involved reacting at least 3.0 moles of propylene oxide per mole of diamine, as described in U.S. Pat. No. 5,840,781. An alkaline catalyst, such as potassium hydroxide, is then added and the propoxylation continued ("PO2 step") at about 150° C. until the desired measured OH number (sometimes about 340 to 380 mg KOH/g) is achieved, resulting in a polyether polyol having a viscosity that may be particularly suitable for use in certain polyurethane foam applications, such as in the manufacture of rigid polyurethane appliance foams.

In some cases, however, it may be desirable to produce an aromatic diamine-based polyether polyol with a significantly higher hydroxyl number (10% higher or more), in order to produce a polyether polyol that can provide a polyurethane foam with improved performance such as reduced demold times and improved thermal insulation. Unfortunately, using the process described above and simply adjusting the recipe to yield a higher hydroxyl number would result in a product with a much higher viscosity. It would also increase the amount of unreacted diamine present in the final product, which is also undesirable. Increasing the temperature of PO1 and/or PO2 would tend to decrease the viscosity, but would also increase the amount of unreacted diamine in the final product. Decreasing the temperature would exacerbate the problem of high viscosity and also increase the cycle time of the process.

As a result, it would be desirable to provide a process for producing a polyether polyol based on an aromatic diamine such as o-TDA that can provide a product with significantly higher hydroxyl numbers, but without significantly effecting the product viscosity or the production cycle time of the polyether polyol, all while providing a polyol with low residual unreacted aromatic diamine content.

SUMMARY

In certain respects, the specification relates to a process for producing an aromatic diamine-initiated polyether polyol having a measured OH number of 300 to 500 mg KOH/g and a viscosity at 25° C. of 5000 to 50,000 mPas. The process comprises: (a) a first alkoxylation step comprising reacting an alkylene oxide consisting essentially of propylene oxide with a starter consisting essentially of aromatic diamine at a molar ratio of propylene oxide to aromatic diamine of 1.4:1 to 2.0:1 to form an alkoxylated product; and (b) a second alkoxylation step comprising reacting an alkylene oxide consisting essentially of propylene oxide with the alkoxylated product, in the presence of an added catalyst, until the ratio of total moles of propylene oxide added in the process to the moles of aromatic diamine added in the process is 4:1 to 9:1.

In other respects, this specification relates to processes for producing a polyether polyol having a measured OH number of 300 to 500 mg KOH/g. These processes comprise: (a) a first alkoxylation step comprising reacting an alkylene oxide consisting essentially of propylene oxide with a starter consisting essentially of aromatic diamine at a first temperature and at a molar ratio of propylene oxide to aromatic diamine of 1.4:1 to 2.0:1 to form an alkoxylated product; and (b) a second alkoxylation step comprising reacting an alkylene oxide consisting essentially of propylene oxide with the alkoxylated product, in the presence of an added catalyst, until the ratio of total moles of propylene oxide added in the process to the moles of aromatic diamine added in the process is 4:1 to 9:1, wherein the second alkoxylation step comprises: (i) a first portion conducted at a temperature within 20° C. of the first temperature; and (ii) a second portion conducted at a temperature at least 20° C. higher than the first temperature.

This specification also relates to polyether polyols produced using such a process and polyurethane foams (and methods for their production) produced using such polyether polyols.

BRIEF DESCRIPTION OF THE DRAWINGS

Various features and characteristics of the inventions described in this specification may be better understood by reference to the accompanying figures, in which.

DETAILED DESCRIPTION

Figure 1:
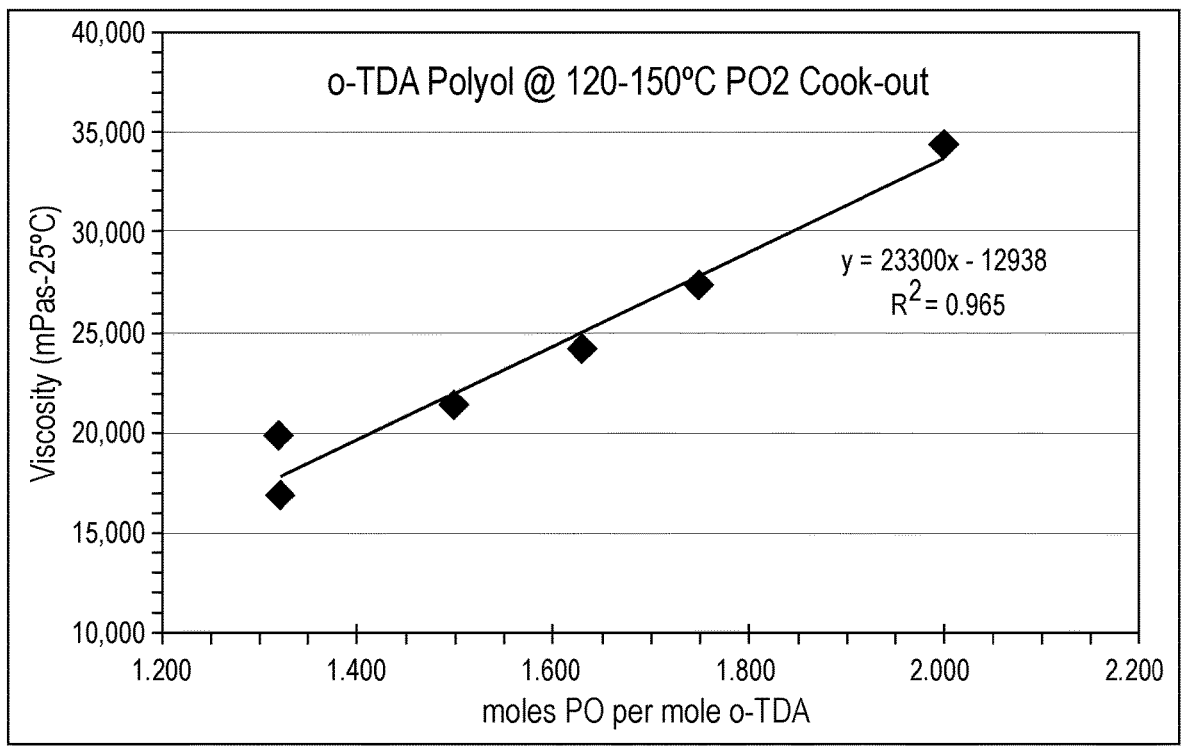
FIG. 1 illustrates the increase in final polyol viscosity that resulted from the increase of the number of moles of PO alkoxylated onto the o-TDA during the self-catalyzed PO1 step in Examples 5-10.

Various embodiments are described and illustrated in this specification to provide an overall understanding of the structure, function, properties, and use of the disclosed inventions. It is understood that the various embodiments described and illustrated in this specification are non-limiting and non-exhaustive. Thus, the invention is not limited by the description of the various non-limiting and non-exhaustive embodiments disclosed in this specification. The features and characteristics described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. § 112 and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant(s) reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112 and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

As used herein, the term "functionality" refers to the average number of reactive hydroxyl groups, —OH, present per molecule of a polyol or polyol blend that is being described. As used in this specification, the "arithmetically calculated functionality" of a polyol is based on resin solids and is calculated by adding reacted water with the hydroxyl equivalents of the reacted other polyhydroxyl compound(s), such as sucrose, divided by the hydroxyl equivalents of the reacted water multiplied by its functionality (2) plus the hydroxyl equivalents of the reacted other polyhydroxyl compound(s) sucrose multiplied by their functionality, such as (8) in the case of sucrose. The amount of reacted water is calculated by analyzing, using gas chromatography, the weight percent of glycol in the resultant polyol.

As used herein, the term "measured OH number" or "measured hydroxyl number" refers to the number of reactive hydroxyl groups available for reaction, and is expressed as the number of milligrams of potassium hydroxide equivalent to the hydroxyl content of one gram of the polyol, and is determined according to ASTM D4274-16. The term "equivalent weight" refers to the weight of a compound divided by its valence. For a polyol, the equivalent weight is the weight of the polyol that will combine with an isocyanate group, and may be calculated by dividing the molecular weight of the polyol by its functionality. The equivalent weight of a polyol may also be calculated by dividing 56,100 by the hydroxyl number of the polyol—Equivalent Weight (g/eq)=(56.1×1000)/OH number.

The viscosity values of a polyol reported herein refer to a viscosity determined using an Anton-Paar SVM 3000 viscometer at 25° C. that has been demonstrated to give equivalent results as can be generated with ASTM-D4878-15, in which the instrument has been calibrated using mineral oil reference standards of known viscosity.

The number average and weight average, Mn and Mw, respectively, molecular weights reported herein can be determined by gel-permeation chromatography (GPC) using a method based on DIN 55672-1, employing chloroform as the eluent with a mixed bed column (Agilent PL Gel; SDVB; 3 micron Pore diameter: 1×Mixed-E+5 micron Pore diameter: 2×Mixed-D), refractive index (RI) detection and calibrated with polyethylene glycol as the standard.

As indicated, certain embodiments of the present specification are directed to processes for producing an aromatic amine-initiated polyether polyol. The polyether polyols produced according to the processes of this specification can have a functionality of, for example, at least 2, such as 2 to 6, 3 to 5, 3.5 to 4.5 or 3.8 to 4.2 or 3.8 to 4.0. In certain implementations, the polyether polyol has a number average molecular weight of 200 Da to 12,000 Da, such as 200 Da to 1,500 Da, 200 Da to 1,000 Da, 400 Da to 800 Da, 500 Da to 700 Da, or 500 Da to 600 Da. In some embodiments, the polyether polyols produced according to the processes of the present specification have a viscosity at 25° C. of at least 5000 mPas, such as 5000 to 50,000 mPas, 5000 to 30,000 mPas, 10,000 to 30,000 mPas or 20,000 to 30,000 mPas. In some embodiments, the polyether polyols produced according to the processes of the present specification have a measured hydroxyl number of 300 to 500 mg KOH/g, 350 to 450 mg KOH/g, or, in some cases, 380 to 420 mg KOH/g. In some implementations, the polyether polyols have a free aromatic amine content of no more than 1500 ppm, in some cases no more than 1000 ppm, measured as described in the Examples.

The processes of this specification comprise alkoxylating a polyol starter consisting essentially of an aromatic diamine with an alkylene oxide consisting essentially of propylene oxide.

As used herein, when it is stated that a polyol starter "consists essentially of" an aromatic diamine and that the alkylene oxide "consists essentially of" propylene oxide, it means that, while other starters and alkylene oxides may be used, they may only be present to the extent that such other starters and alkylene oxides do not materially affect the basic and novel characteristic(s) of the processes of this specification. In this context, these basic and novel characteristics relate to a process that produces a polyether polyol having a measured OH number of 300 to 500 mg KOH/g, a viscosity at 25° C. of 5000 to 50,000 mPas, and, in some cases, a free aromatic amine content of no more than 1500 ppm, all at a relatively low cycle time, i.e., completion of PO2 in no more than 6 hours.

In some implementations, the aromatic diamine starter is used in an amount of at least 95% by weight, or, in yet other cases, at least 99% by weight, based on the total weight of polyol starter used to produce the polyether polyol. As used herein, when it is stated that the polyol starter "consists of" an aromatic diamine, it means that the aromatic diamine starter is 100% of the polyol starter used to produce the polyether polyol.

Suitable aromatic diamine starters can be monomeric or polymeric and can have primary amine and/or secondary amine functional groups. For example, a primary amine, R—$NH_2$ reacts with epoxides to give two hydroxyl groups. For example, $RNH_2$ can react with 2 moles of propylene oxide to yield HO—$CH_2CH_2CH_2$—NR—$CH_2CH_2CH_2$—OH. Therefore, an amine functionality of 1 in this case gives a polyol functionality of 2 and a diamine with 2 primary amine groups gives a polyol functionality of 4. Examples of suitable aromatic amines include, but are not limited to, crude toluene diamine obtained by the nitration of toluene followed by reduction, 2,3-toluene diamine, 3,4-toluene diamine, 2,4-toluene diamine, and 2,6-toluene diamine or mixtures thereof, 4,4'-methylene dianiline, methylene-bridged polyphenyl polyamines composed of isomers of methylene dianilines and triamines, and or polyamines of higher molecular weight prepared by reacting aniline with formaldehyde, as well as mixtures of any two or more of the foregoing.

If desired, as previously indicated, in addition to the aromatic diamine starter, other H-functional starters may be used. In some implementations, one or more additional hydroxyl and/or amine functional starters is employed. In some implementations, for example, such additional starter(s) may comprise trimethylolethane, trimethylolpropane, glycerol, pentaerythritol, 4,4'-dihydroxydiphenyl-propane, sorbitol, sucrose, ethylenediamine, monoethanolamine, diethanolamine, methyl amine, ethylene diamine, diethylene triamine, triethylene tetramine, triethanolamine, ethylene glycol, 1,2- or 1,3-propanediol, 1,2-, 1,3- or 1,4-butanediol, 1,5-heptanediol, 1,6-hexanediol, 1,4-cyclohexanedimethanol, 1,4-cyclohexanedimethanol, 1,3-cyclohexanedimethanol, 1,2-cyclohexanedimethanol, tricyclodecanedimethanol, adamantanediol, pentacyclopentadecanedimethanol, glycerin, pentaerythritol, 4,4'-dihydroxy-diphenylpropane, ammonia, aniline, ethanolamine, triethanolamine, and ethylene diamine, or a mixture of any two or more of the foregoing. Oligomeric and/or polymeric polyols, such as polyether polyols, are also suitable starters, as are Mannich reaction products of phenol or substituted phenols with alkanol amines and formaldehyde or paraformaldehyde.

In some implementations, however, the aromatic diamine, such as a toluene diamine (such as ortho-toluene diamine) starter is present in an amount of at least 95% by weight, or, in yet other cases, at least 98% by weight or at least 99% by weight, based on the total weight of H-functional initiator used to prepare the polyether polyol.

As indicated earlier, the processes of this specification comprise alkoxylating the starter with an alkylene oxide. The processes of this specification comprise alkoxylating a polyol starter comprising consisting essentially of an aromatic diamine with an alkylene oxide consisting essentially of propylene oxide.

In some implementations, the propylene oxide is used in an amount of at least 95% by weight, or, in yet other cases, at least 99% by weight, based on the total weight of alkylene oxide used to produce the polyether polyol. As used herein, when it is stated that the alkylene oxide "consists of" propylene oxide, it means that the propylene oxide is 100% of the alkylene oxide used to produce the polyether polyol.

Thus, if desired, in addition to the propylene oxide, minor amounts of other alkylene oxides may be used. Suitable alkylene oxides include, for example, ethylene oxide, butylene oxide, styrene oxide, epichlorohydrin, as well as mixtures of any two or more thereof. If more than one type of alkylene oxide, is used, they can be used sequentially or simultaneously.

As indicated earlier, the processes of this specification comprise a first alkoxylation step ("PO1") comprising reacting an alkylene oxide consisting essentially of propylene oxide with a starter consisting essentially of aromatic diamine at a molar ratio of propylene oxide to aromatic diamine of 1.4:1 to 2.0:1 to form an alkoxylated product. Thus, in carrying out the first alkoxylation step, one mole of aromatic diamine, such as one or more isomers of toluene diamine, is reacted with from 1.4 to 2.0, 1.4 to 1.8 or, in some cases, 1.5 to 1.8 moles of propylene oxide. The reaction between propylene oxide and the aromatic diamine is carried out at a temperature in the range of, for example, 90° C. to 180° C., such as 120° C. to 150° C., or, in some cases 120° C. to 130° C. at atmospheric pressure or moderately elevated pressure. Of course, lower temperatures could be used, but the reaction time will be necessarily extended. The alkylene oxide is often added, either continuously or intermittently, at such a rate that the reaction temperature and pressure can be maintained at the desired levels.

The first alkoxylation step is typically conducted in the substantial or complete absence of any added catalyst.

Although a reaction diluent is usually not necessary in carrying out the above alkoxylation, an inert liquid diluent can be present in the reaction mixture, if desired, to aid in the dispersion of the alkylene oxide in the amine mixture. Examples of suitable diluents include monochlorobenzene, N,N-dimethylformamide, toluene, xylene, and the like.

The reaction product resulting from the first alkoxylation step can be purified, if desired, but is often employed, without further treatment, in the second alkoxylation step. If purification of the alkoxylated reaction product is desired before use of the product in the second alkoxylation, the purification can be effected using procedures known in the art. For example, the excess of alkylene oxide, if any is present, can be removed by entrainment in a stream of inert gas such as nitrogen, argon, or xenon; if an inert organic solvent has been employed as reaction solvent, this can be removed by distillation under reduced pressure and the residue from such treatment or treatments can be purified by chromatography, countercurrent distillation and the like.

It has been discovered, surprisingly, that by conducting PO1 such that a molar ratio of propylene oxide to aromatic diamine of 1.4:1 to 2.0:1 is maintained, it is possible, when combined with the second alkoxylation step described below, to produce a polyether polyol having a viscosity similar to a comparable polyether polyol prepared at the same or very similar temperature profile, but resulting in a measured OH number that is at least up to 10% higher. Moreover, this can be achieved without significantly increasing the cycle time of the manufacturing process and without resulting in an unacceptably high amount of free aromatic amine in the product.

In the second alkoxylation step ("PO2"), the alkoxylated product from the first alkoxylation step described above is reacted with an alkylene oxide consisting essentially of propylene oxide, in the presence of an added catalyst, until the ratio of the total moles of propylene oxide added in the process to the moles of aromatic diamine added in the process is 4:1 to 9:1, such as 6:1 to 8:1 or 6:1 to 7:1, and until a polyether polyol having a measured OH number of 300 to 500 mg KOH/g, 350 to 450 mg KOH/g, or, in some cases, 380 to 420 mg KOH/g is obtained. In some implementation, the second alkoxylation step is carried out at a temperature of 90° C. to 180° C., such as 120° C. to 150° C., at atmospheric pressure or moderately elevated pressure in the presence of the added catalyst. Lower reaction temperature could be employed with an increase in reaction times.

As indicated, the PO2 step is conducted in the presence of added catalyst. Any alkoxylation catalyst known in the art can be employed for this purpose. Examples of such catalysts are tertiary amines such as pyridine, triethylamine and the like, alkali metals such as sodium, potassium, and lithium and alkali metal hydroxides such as sodium hydroxide, potassium hydroxide, lithium hydroxide, and the like. The amount of added alkoxylation catalyst employed may, for example, be within the range of 0.0001 to 1, such as 0.01 to 0.5, part by weight of catalyst per 100 parts by weight of polyether polyol produced.

In some implementations of the processes described herein, PO2 is at least partially carried out at a temperature higher than PO1. For example, in some implementations, PO2 is at least partially conducted at a temperature that is at least 20° C. higher than PO1, in some cases at least 30° C. higher than PO1. More specifically, in some implementations, PO2 is conducted initially (such as during or throughout propylene oxide addition) at or near the temperature of PO1 (such as within 20° C., within 10° C. or within 5° C. as PO1) and then increased during a post-reaction period after PO addition. The temperature during PO2 can be increased during and/or after the alkylene oxide addition of PO2. This temperature increase, it has been discovered, can enable production of polyether polyols having a desirable viscosity and measured OH number, all at a relatively low cycle time. For example, in some implementations, PO2 (which encompasses an alkylene oxide addition period and subsequent "post-reaction" period to allow the alkylene oxide to react to form the resulting polyether polyol of desired measured OH number) is completed in no more than 6 hours, in some cases, no more than 5 hours or, in some cases, no more than 4 hours.

After the second alkoxylation step, the resultant reaction mixture which contains the added alkaline catalyst, often in an amount of 0.1% to 1.0% as KOH, may be neutralized. In certain implementations, the reaction mixture is neutralized with a hydroxy-carboxylic acid, though, as will be appreciated, other acids, such as sulfuric acid or phosphoric acid, could be used if desired. Neutralization may be accomplished by mixing the hydroxy-carboxylic acid and reaction mixture at ambient conditions with stirring. Neutralization need not be exact neutrality (i.e., pH=7.0). The reaction mixture may be maintained at a slight acidity or alkalinity, i.e., at a pH of 5 to 11, such as 6 to 10. The neutralized catalyst is desirably soluble in the polyether polyol so that the product amine-initiated polyol may be used in polyurethane foam-forming equipment without subsequent treatment and without generating large amounts of solid waste material.

Examples of hydroxy carboxylic acids useful in the above-described neutralization step include lactic acid, salicylic acid, substituted salicylic acids, such as 2-hydroxy 3-methyl benzoic acid, 2-hydroxy 4-methyl benzoic acid and combinations thereof.

The polyether polyols produced by the process described in this specification can be used in a variety of applications. In some cases, however, they are useful for producing rigid polyurethane foams. Such foams can be produced by reacting an organic isocyanate with a polyether polyol produced by the processes of this specification, in the presence of a blowing agent and a catalyst at an isocyanate index of from 0.9 to 3.1, such as 1.05 to 1.55.

Suitable organic isocyanates include aromatic, aliphatic, and cycloaliphatic polyisocyanates and combinations thereof. Examples of useful isocyanates are: diisocyanates such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,4-cyclohexane diisocyanate, hexahydrotoluene diisocyanate and its isomers, 1,5-naphthylene diisocyanate, 1-methyl-phenyl-2,4-phenyl diisocyanate, 4,4'-diphenylmethane diisocyanate, 2,4'-diphenyl-methane diisocyanate, 4,4'-biphenylene diisocyanate, 3,3'-dimethoxy-4,4'-biphenylene diisocyanate and 3,3'-dimethyl-diphenyl-propane-4, 4'-diisocyanate; triisocyanates such as 2,4,6-toluene triisocyanate; and polyisocyanates such as 4,4'-dimethyl-diphenyl-methane-2,2', 5,5'-tetraisocyanate and the polymethylene polyphenylpolyisocyanates.

Undistilled or a crude polyisocyanate may also be used in making polyurethanes. The crude toluene diisocyanate obtained by phosgenating a mixture of toluene diamines and the crude diphenylmethane diisocyanate obtained by phosgenating crude diphenylmethanediamine are examples of suitable crude polyisocyanates.

In some cases, the polyisocyanates are methylene-bridged polyphenyl polyisocyanates and prepolymers of methylene-bridged polyphenyl polyisocyanates having an average functionality of from 1.8 to 3.5 (such as 2.0 to 3.1) isocyanate moieties per molecule and an NCO content of from about 28 to about 34% by weight, due to their ability to cross-link the polyurethane.

Often, the polyisocyanate is used in an amount such that the isocyanate index (i.e., the ratio of equivalents of isocyanate groups to equivalents of isocyanate-reactive groups) is from 0.9 to 3.0, such as from 1.0 to 1.5. In some cases, the polyether polyol prepared by the processes of the present specification are included in the foam-forming mixture in an amount of from 5 to 35% by weight, based on the total foam-forming mixture, such as from 20 to 30% by weight.

Other polyether polyols (i.e., polyether polyols which are not prepared by the processes described in this specification) known to be useful in the production of rigid polyurethane foams may, if desired, be used in combination with the polyether polyols produced as described herein. When used, these optional polyols are sometimes present in an amount which is no greater than 60%, such as from 20% to 50% of the total amount of polyol.

The blowing agent employed may be any one of the known hydrogen-containing chlorofluorocarbons or hydrogen containing fluorocarbons, as well as halogenated olefins. Suitable halogenated olefins include those containing 3 or 4 carbon atoms, at least one carbon-carbon double bond, and have a boiling point of −25° C. to 40° C. at 1 atm pressure. Some examples of such compounds include trans-1,1,1-trifluoro-3-chloropropene (or HCFO 1233zd(E)), cis-1,1,1,4,4,4-hexafluorobutene (or HFO 1336mzz(Z)), and trans-1,1,1,3-tetrafluoropropene (or HFO 1234ze(E)). Specific examples of fluorocarbons include: 1,1-dichloro-2,2,2-trifluoroethane (HCFC-123), 1,1-dichloro-1-fluoroethane (HCFC-141b), 1,1,1,4,4,4-hexafluorobutane (HFC-356), and 1,1,1,2-tetrafluoroethane (HFC-134a). Hydrocarbons which are known to function as blowing agents in rigid foam systems may also be used, examples of which include: n-pentane, cyclopentane, and isopentane. Mixtures of the HCFC, HFC, HFCO and/or HFO with hydrocarbon blowing agents may also be used. The blowing agent is generally included in the foam-forming mixture in an amount of from 5 to 20% by weight, based on the total foam formulation, preferably from 8 to 16% by weight.

Water may be included in the reaction mixtures as well. When used, the water is often present in an amount of from 0.1% to 2%, based on the total foam formulation. Any of the catalysts known to be useful in the production of rigid polyurethane foams may also be employed, such as tertiary amine catalysts. Specific examples of suitable catalysts include: pentamethyldiethylenetriamine, N—N-dimethylcyclohexylamine, N,N',N"-dimethylamino-propylhexahydrotriazine, and tetramethyl ethylenediamine.

Materials which may optionally be included in the foam-forming mixtures also include chain extenders, crosslinking agents, surfactants, pigments, colorants, fillers, antioxidants, flame retardants, and stabilizers.

Various aspects of the subject matter described herein are set out in the following numbered clauses:

Clause 1. A process for producing an aromatic diamine-initiated polyether polyol having a measured OH number of 300 to 500 mg KOH/g and a viscosity at 25° C. of 5000 to 50,000 mPas comprising: (a) a first alkoxylation step comprising reacting an alkylene oxide consisting essentially of propylene oxide with a starter consisting essentially of aromatic diamine at a molar ratio of propylene oxide to aromatic diamine of 1.4:1 to 2.0:1 to form an alkoxylated product; and (b) a second alkoxylation step comprising reacting an alkylene oxide consisting essentially of propylene oxide with the alkoxylated product, in the presence of an added catalyst, until the ratio of total moles of propylene oxide added in the process to the moles of aromatic diamine added in the process is 4:1 to 9:1.

Clause 2. The process of clause 1, wherein the polyether polyol has a functionality of at least 2, 2 to 6, 3 to 5, 3.5 to 4.5, 3.8 to 4.2 or 3.8 to 4.0.

Clause 3. The process of clause 1 or clause 2, wherein the polyether polyol has a number average molecular weight of 200 Da to 12,000 Da, 200 Da to 1,500 Da, 200 Da to 1,000 Da, 400 Da to 800 Da, 500 Da to 700 Da, or 500 Da to 600 Da.

Clause 4. The process of one of clause 1 to clause 3, wherein the polyether polyol has a viscosity at 25° C. of 5000 to 30,000 mPas, 10,000 to 30,000 mPas, or 20,000 to 30,000 mPas.

Clause 5. The process of one of clause 1 to clause 4, wherein the polyether polyol has a measured hydroxyl number of 350 to 450 mg KOH/g or 380 to 420 mg KOH/g.

Clause 6. The process of one of clause 1 to clause 5, wherein the polyether polyol has a free aromatic amine content of no more than 1500 ppm or no more than 1000 ppm.

Clause 7. The process of one of clause 1 to clause 6, wherein the aromatic diamine starter is used in an amount of at least 95% by weight, at least 98% by weight, at least 99% by weight, or 100% by weight, based on the total weight of starter used to produce the polyether polyol.

Clause 8. The process of one of clause 1 to clause 7, wherein the aromatic diamine comprises 2,3-toluene diamine, 3,4-toluene diamine, 2,4-toluene diamine, 2,6-toluene diamine, or a mixture of any two or more thereof.

Clause 9. The process of one of clause 1 to clause 8, wherein propylene oxide is used in an amount of at least 95% by weight, at least 98% by weight, at least 99% by weight, or 100% by weight, based on the total weight of alkylene oxide used to produce the polyether polyol.

Clause 10. The process of one of clause 1 to clause 9, wherein, in the first alkoxylation step, the alkylene oxide consisting essentially of propylene oxide and starter consisting essentially of aromatic diamine are reacted at a molar ratio of propylene oxide to aromatic diamine of 1.4 to 1.8 or 1.5 to 1.8.

Clause 11. The process of one of clause 1 to clause 10, wherein the reaction between propylene oxide and the aromatic diamine is carried out in the first alkoxylation step at a temperature of 90° C. to 180° C., 120° C. to 150° C., or 120° C. to 130° C.

Clause 12. The process of one of clause 1 to clause 11, wherein the first alkoxylation step is conducted in the substantial or complete absence of any added catalyst.

Clause 13. The process of one of clause 1 to clause 12, wherein the first alkoxylation step is carried out in the presence of a reaction diluent comprising monochlorobenzene, N,N-dimethylformamide, toluene, xylene, or a mixture of any two or more thereof.

Clause 14. The process of one of clause 1 to clause 13, wherein, the second alkoxylation step is conducted until the ratio of the total moles of propylene oxide added in the process to the moles of aromatic diamine added in the process is 6:1 to 8:1 or 6:1 to 7:1.

Clause 15. The process of one of clause 1 to clause 14, wherein the second alkoxylation step is carried out at a temperature of 90° C. to 180° C. or 120° C. to 150° C.

Clause 16. The process of one of clause 1 to clause 15, wherein the added catalyst comprises a tertiary amine; such as pyridine, trimethylamine, or a mixture thereof; an alkali metal, such as sodium, potassium, lithium, or a mixture of any two or more thereof; an alkali metal hydroxide, such as sodium hydroxide, potassium hydroxide, lithium hydroxide, or a mixture of any two or more thereof; or a mixture of any two or more of the foregoing catalysts.

Clause 17. The process of one of clause 1 to clause 16, wherein the added catalyst is present in an amount of 0.0001 to 1 or 0.01 to 0.5, part by weight of catalyst per 100 parts by weight of polyether polyol produced.

Clause 18. The process of one of clause 1 to clause 17, wherein the second alkoxylation step is at least partially carried out at a temperature higher than the first alkoxylation step, such as where the second alkoxylation step is at least partially conducted at a temperature that is at least 20° C. higher or at least 30° C. higher than the first alkoxylation step.

Clause 19. The process of clause 18, wherein the second alkoxylation step is conducted initially (such as during or throughout propylene oxide addition) at or near the temperature of the first alkoxylation step (such as within 20° C., within 10° C. or within 5° C. of the first alkoxylation step)

and then the temperature is increased during propylene oxide addition or during a post-reaction period after propylene oxide addition.

Clause 20. The process of one of clause 1 to clause 19, wherein the second alkoxylation step is completed in no more than 6 hours, no more than 5 hours or no more than 4 hours.

Clause 21. The process of one of clause 1 to clause 20, wherein the reaction mixture is neutralized with a hydroxycarboxylic acid, such as lactic acid, salicylic acid, a substituted salicylic acid, or a mixture of any two or more thereof.

Clause 22. A process of producing a rigid polyurethane foam comprising reacting an organic isocyanate with a polyether polyol produced by the process of one of clause 1 to clause 21 in the presence of a blowing agent and a catalyst at an isocyanate index of 0.9 to 3.1 or 1.05 to 1.55.

Clause 23. A process for producing a polyether polyol having a measured OH number of 300 to 500 mg KOH/g comprising: (a) a first alkoxylation step comprising reacting an alkylene oxide consisting essentially of propylene oxide with a starter consisting essentially of aromatic diamine at a first temperature and at a molar ratio of propylene oxide to aromatic diamine of 1.4:1 to 2.0:1 to form an alkoxylated product; and (b) a second alkoxylation step comprising reacting an alkylene oxide consisting essentially of propylene oxide with the alkoxylated product, in the presence of an added catalyst, until the ratio of total moles of propylene oxide added in the process to the moles of aromatic diamine added in the process is 4:1 to 9:1, wherein the second alkoxylation step comprises: (i) a first portion conducted at a temperature within 20° C. of the first temperature; and (ii) a second portion conducted at a temperature at least 20° C. higher than the first temperature.

Clause 24. The process of clause 23, wherein the polyether polyol has a functionality of at least 2, 2 to 6, 3 to 5, 3.5 to 4.5, 3.8 to 4.2 or 3.8 to 4.0.

Clause 25. The process of clause 23 or clause 24, wherein the polyether polyol has a number average molecular weight of 200 Da to 12,000 Da, 200 Da to 1,500 Da, 200 Da to 1,000 Da, 400 Da to 800 Da, 500 Da to 700 Da, or 500 Da to 600 Da.

Clause 26. The process of one of clause 23 to clause 25, wherein the polyether polyol has a viscosity at 25° C. of 5000 to 50,000 mPas, 5000 to 30,000 mPas, 10,000 to 30,000 mPas, or 20,000 to 30,000 mPas.

Clause 27. The process of one of clause 23 to clause 26, wherein the polyether polyol has a measured hydroxyl number of 350 to 450 mg KOH/g or 380 to 420 mg KOH/g.

Clause 28. The process of one of clause 23 to clause 27, wherein the polyether polyol has a free aromatic amine content of no more than 1500 ppm or no more than 1000 ppm.

Clause 29. The process of one of clause 23 to clause 28, wherein the aromatic diamine starter is used in an amount of at least 95% by weight, at least 98% by weight, at least 99% by weight, or 100% by weight, based on the total weight of starter used to produce the polyether polyol.

Clause 30. The process of one of clause 23 to clause 29, wherein the aromatic diamine comprises 2,3-toluene diamine, 3,4-toluene diamine, 2,4-toluene diamine, 2,6-toluene diamine, or a mixture of any two or more thereof.

Clause 31. The process of one of clause 23 to clause 30, wherein propylene oxide is used in an amount of at least 95% by weight, at least 98% by weight, at least 99% by weight, or 100% by weight, based on the total weight of alkylene oxide used to produce the polyether polyol.

Clause 32. The process of one of clause 23 to clause 31, wherein, in the first alkoxylation step, the alkylene oxide consisting essentially of propylene oxide and starter consisting essentially of aromatic diamine are reacted at a molar ratio of propylene oxide to aromatic diamine of 1.4 to 1.8 or 1.5 to 1.8.

Clause 33. The process of one of clause 23 to clause 32, wherein the reaction between propylene oxide and the aromatic diamine is carried out in the first alkoxylation step at a temperature of 90° C. to 180° C., 120° C. to 150° C., or 120° C. to 130° C.

Clause 34. The process of one of clause 23 to clause 33, wherein the first alkoxylation step is conducted in the substantial or complete absence of any added catalyst.

Clause 35. The process of one of clause 23 to clause 34, wherein the first alkoxylation step is carried out in the presence of a reaction diluent comprising monochlorobenzene, N,N-dimethylformamide, toluene, xylene, or a mixture of any two or more thereof.

Clause 36. The process of one of clause 23 to clause 35, wherein, the second alkoxylation step is conducted until the ratio of the total moles of propylene oxide added in the process to the moles of aromatic diamine added in the process is 6:1 to 8:1 or 6:1 to 7:1.

Clause 37. The process of one of clause 23 to clause 36, wherein the second alkoxylation step is carried out at a temperature of 90° C. to 180° C. or 120° C. to 150° C.

Clause 38. The process of one of clause 23 to clause 37, wherein the added catalyst comprises a tertiary amine; such as pyridine, trimethylamine, or a mixture thereof; an alkali metal, such as sodium, potassium, lithium, or a mixture of any two or more thereof; an alkali metal hydroxide, such as sodium hydroxide, potassium hydroxide, lithium hydroxide, or a mixture of any two or more thereof; or a mixture of any two or more of the foregoing catalysts.

Clause 39. The process of one of clause 23 to clause 38, wherein the added catalyst is present in an amount of 0.0001 to 1 or 0.01 to 0.5, part by weight of catalyst per 100 parts by weight of polyether polyol produced.

Clause 40. The process of one of clause 23 to clause 39, wherein the second alkoxylation step is conducted initially (such as during or throughout propylene oxide addition) at or near the temperature of the first alkoxylation step (such as within 20° C., within 10° C. or within 5° C. of the first alkoxylation step) and then the temperature is increased during propylene oxide addition or during a post-reaction period after propylene oxide addition.

Clause 41. The process of one of clause 23 to clause 40, wherein the second alkoxylation step is completed in no more than 6 hours, no more than 5 hours or no more than 4 hours.

Clause 42. The process of one of clause 23 to clause 41, wherein the reaction mixture is neutralized with a hydroxycarboxylic acid, such as lactic acid, salicylic acid, a substituted salicylic acid, or a mixture of any two or more thereof.

Clause 43. A process of producing a rigid polyurethane foam comprising reacting an organic isocyanate with a polyether polyol produced by the process of one of clause 23 to clause 42 in the presence of a blowing agent and a catalyst at an isocyanate index of 0.9 to 3.1 or 1.05 to 1.55.

EXAMPLES

Various polyether polyols were prepared in a stainless steel stirred reactor using the ingredients listed in the tables below using the following procedure. The reactor was preheated to a temperature of 90 C and charged with molten ortho-toluene diamine (o-TDA) having a temperature of 90° C. The reactor temperature was raised to the desired alkoxylation temperature with stirring and the desired first amount of propylene oxide (PO1) was dosed to the reactor at a rate sufficient to maintain a reaction pressure below 50 psig. Once the desired amount of PO1 was fed, the reactor was held at that temperature (or adjusted to a new temperature) for a sufficient time to fully react all of the propylene oxide added in PO1 ("post-reaction"). The residual nitrogen pressure was vented and the desired amount of aqueous potassium hydroxide (KOH) was added. The reactor temperature was set to the desired alkoxylation temperature and the desired second amount of propylene oxide (PO2) was dosed to the reactor at a rate sufficient to maintain the reaction pressure below 50 psig. Once the desired amount of PO2 was fed, the reactor was held at that temperature (or adjusted to a new temperature) for a sufficient time to fully react all of the propylene oxide added in PO2 ("post-reaction"). After completion of the PO2 addition, the reactor was cooled to 80° C. and the desired amount of lactic acid was added to fully neutralize the KOH. The lactic acid reacted with the KOH to form soluble potassium lactate salts. The reactor temperature was raised to 135° C. and the mixture was de-watered using vacuum distillation with a slight nitrogen sparge through the mixture. The reactor was cooled to 90° C. and charged with Irganox 1076 as an antioxidant and agitated for 30 minutes. The final polyether polyol was then collected.

Polyether polyol example #1 (Table 1) was a large scale pilot run to prepare enough material for polyurethane foam experimentation. In polyether polyol example #4 (Table 1) the temperature was raised during the PO2 feed after 90% of the desired amount of propylene oxide had been fed.

TABLE 1

|  | Example | | | |
|---|---|---|---|---|
|  | 1 Counter Example | 2 Counter Example | 3 Counter Example | 4 Counter Example |
| o-TDA[1] wt. (gms) | 7578 lbs. | 1933.9 | 3605.4 | 3804.9 |
| Moles PO1/mole o-TDA | 1.32 | 1.32 | 1.38 | 1.32 |
| PO1 Feed[3] | | | | |
| temp (° C.) | 120 | 120 | 120 | 120 |
| wt. (gms) | 4751 lbs | 1213.6 | 2368.1 | 2390.2 |
| post-reaction (° C.) | 120 | 120 | 120 | 120 |
| time (min) | 111 | 129 | 121 | 129 |
| KOH[2] wt. (gms) | 227 lbs (0.338%) | 58.3 (0.344%) | 107.0 (0.335%) | 116.2 (0.353%) |
| PO2 Feed[3] | | | | |
| temp (° C.) | 120 | 120 | 150 | 120 → 150 |
| Wt. (gms) | 17638 lbs | 4492.5 | 8380.0 | 8843.1 |
| post-reaction (° C.) | 120 | 120 | 150 | 150 |
| time (min) | 726 | 511 | 234 | 517 |
| Total cycle time (min) | 837 | 640 | 355 | 646 |
| Lactic acid[4] wt. (gms) | 206 lbs | 53.0 | 97.4 | 105.8 |
| I-1076[5] wt. (gms) | 12 lbs | 3.1 | 6.2 | 6.2 |
| OH#[6] (mg KOH/gm) | 409.4 | 411.1 | 397.1 | 404.5 |
| Viscosity[7] (mPas) | 23800 | 26400 | 10920 | 19700 |
| Free TDA[8] (ppm) | 489 | 924 | 2830 | 1070 |

[1]ortho-toluene diamine (o-TDA), obtained from Covestro LLC.
[2]Aqueous potassium hydroxide (45%) obtained from Fisher Scientific.
[3]Propylene oxide obtained from Lyondell Chemical Company.
[4]Lactic acid, 88% obtained from Sigma-Aldrich.
[5]Irganox 1076 obtained from Ciba Specialty Chemicals Corporation.
[6]measured according to ASTM D4274-11.
[7]measured at 25° C. according to ASTM D4878 (Method B).
[8]measured by GC-FID using a RXT-200 Column.

Figure 2:
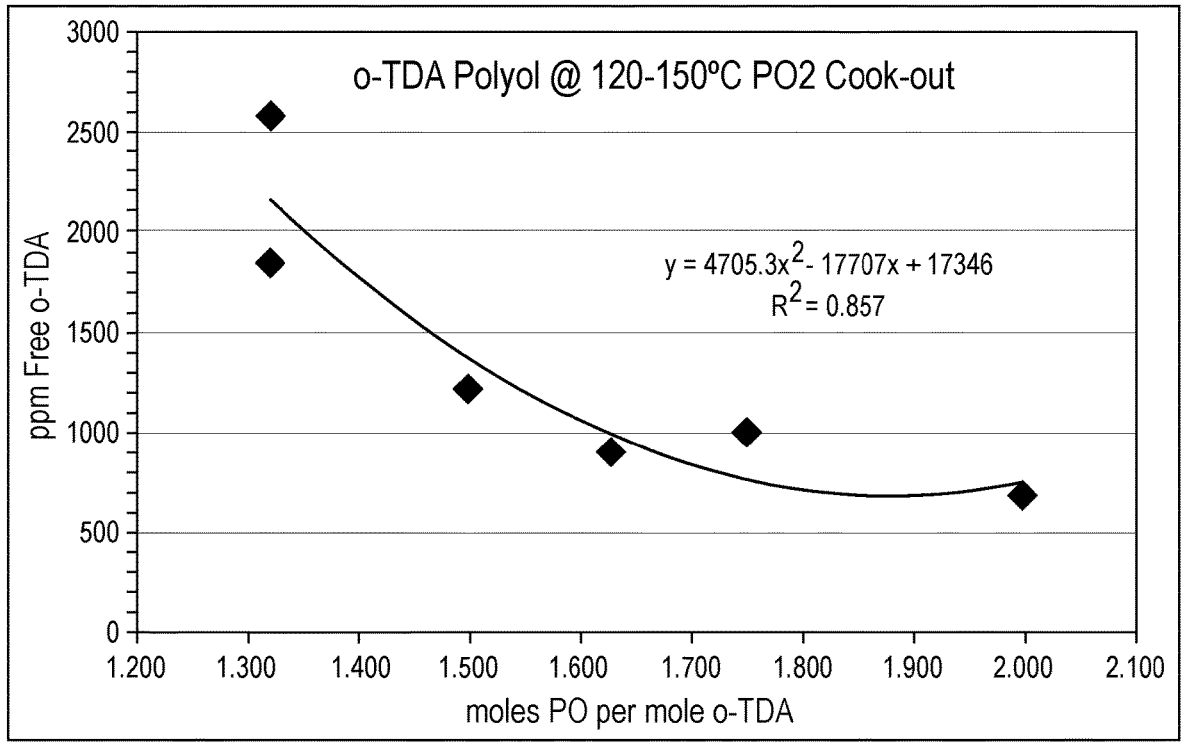
FIG. 2 illustrates the lowering of unreacted o-TDA in the final polyol that resulted from the increase of the number of moles of PO alkoxylated onto the o-TDA during the self-catalyzed PO1 step in Examples 5-10.

During preparation of polyether polyol examples #5-10 (Table 2) the PO2 post-reaction temperature was raised from 120 to 150° C. to speed the alkoxylation reaction. FIG. 1 illustrates the increase in final polyol viscosity that resulted from the increase of the number of moles of PO alkoxylated onto the o-TDA during the self-catalyzed PO1 step. FIG. 2 illustrates the lowering of unreacted o-TDA in the final polyol that resulted from the increase of the number of moles of PO alkoxylated onto the o-TDA during the self-catalyzed PO1 step.

TABLE 2

|  | Example | | | | | |
|---|---|---|---|---|---|---|
|  | 5 Counter Example | 6 Counter Example | 7 Inventive Example | 8 Inventive Example | 9 Inventive Example | 10 Inventive Example |
| o-TDA[1] wt. (gms) | 3645.6 | 3474.7 | 3726.1 | 3858.9 | 4009.6 | 3795.5 |
| Moles PO1/mole o-TDA | 1.32 | 1.32 | 1.50 | 1.75 | 2.00 | 1.63 |

TABLE 2-continued

| | Example | | | | | |
|---|---|---|---|---|---|---|
| | 5<br>Counter<br>Example | 6<br>Counter<br>Example | 7<br>Inventive<br>Example | 8<br>Inventive<br>Example | 9<br>Inventive<br>Example | 10<br>Inventive<br>Example |
| PO1 Feed[3] | | | | | | |
| temp (° C.) | 120 | 120 | 120 | 120 | 120 | 120 |
| wt. (gms) | 2289.4 | 2184.1 | 2657.4 | 3210.6 | 3813.0 | 2941.2 |
| post-reaction (° C.) | 120 | 120 | 120 | 120 | 120 | 120 |
| time (min) | 153 | 122 | 150 | 139 | 187 | 157 |
| KOH[2] wt. (gms) | 109.0<br>(0.341%) | 103.7<br>(0.330%) | 112.0<br>(0.340%) | 116.0<br>(0.340%) | 119.7<br>(0.337%) | 114.0<br>(0.340%) |
| PO2 Feed[3] | | | | | | |
| temp (° C.) | 120 | 120 | 120 | 120 | 120 | 120 |
| Wt. (gms) | 8469.1 | 8498.2 | 8469.5 | 8310.7 | 8162.5 | 8388.8 |
| post-reaction (° C.) | 120 → 150 | 120 → 150 | 120 → 150 | 120 → 150 | 120 → 150 | 120 → 150 |
| time (min) | 317 | 328 | 308 | 298 | 281 | 298 |
| Total cycle time (min) | 470 | 450 | 458 | 437 | 468 | 455 |
| Lactic acid[4] wt. (gms) | 99.5 | 94.5 | 102.0 | 105.0 | 109.0 | 104.0 |
| I-1076[5] wt. (gms) | 5.8 | 5.7 | 6.0 | 6.2 | 6.4 | 6.4 |
| OH#[6] (mg KOH/gm) | 412.2 | 391.9 | 404.2 | 400.9 | 399.1 | 402.4 |
| Viscosity[7] (mPas) | 19867 | 16825 | 21450 | 27400 | 34437 | 24300 |
| Free TDA[8] (ppm) | 1841 | 2569 | 1210 | 989 | 694 | 902 |

Figure 3:
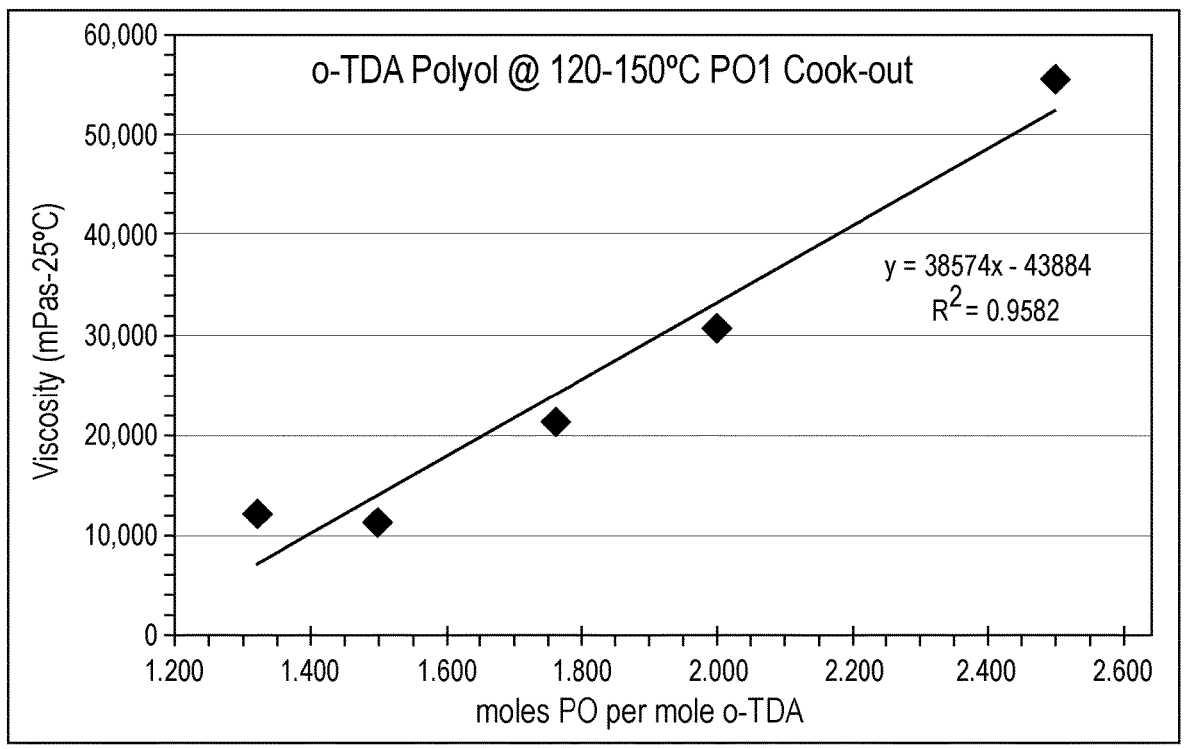
FIG. 3 illustrates the increase in final polyol viscosity that resulted from the increase of the number of moles of PO alkoxylated onto the o-TDA during the self-catalyzed PO1 step in Example 11-15.
Figure 4:
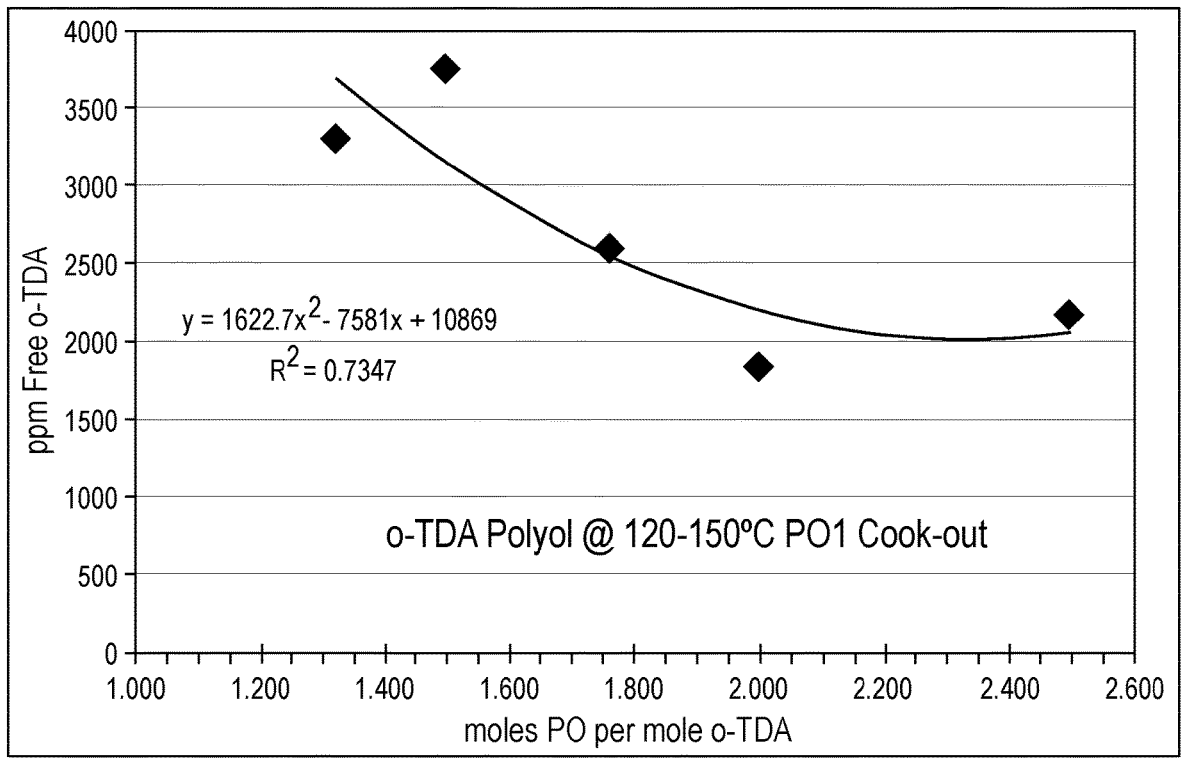
FIG. 4 illustrates the lowering of unreacted o-TDA in the final polyol that resulted from the increase of the number of moles of PO alkoxylated onto the o-TDA during the self-catalyzed PO1 step in Examples 11-15.

During preparation of polyether polyol examples #11-15 (Table 3) the PO1 post-reaction temperature was raised from 120 to 150° C. to speed the alkoxylation reaction. The subsequent PO2 feed and post-reaction was also conducted at 150° C. FIG. 3 illustrates the increase in final polyol viscosity that resulted from the increase of the number of moles of PO alkoxylated onto the o-TDA during the self-catalyzed PO1 step. FIG. 4 illustrates the lowering of unreacted o-TDA in the final polyol that resulted from the increase of the number of moles of PO alkoxylated onto the o-TDA during the self-catalyzed PO1 step.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for producing an aromatic diamine-initiated polyether polyol having a measured OH number of 300 to 500 mg KOH/g and a viscosity at 25° C. of 5000 to 50,000 mPas comprising:

TABLE 3

| | Example | | | | |
|---|---|---|---|---|---|
| | 11 | 12 | 13 | 14 | 15 |
| | | | Type | | |
| | Counter<br>Example | Inventive<br>Example | Inventive<br>Example | Counter<br>Example | Inventive<br>Example |
| o-TDA[1] wt. (gms) | 3476.8 | 3854.3 | 3707.0 | 4120.3 | 3531.8 |
| Moles PO1/mole o-TDA | 1.32 | 1.50 | 2.00 | 2.50 | 1.76 |
| PO1 Feed[3] | | | | | |
| temp (° C.) | 120 | 120 | 120 | 120 | 120 |
| wt. (gms) | 2183.5 | 2748.7 | 3524.6 | 4897.2 | 2956.9 |
| post-reaction (° C.) | 120 → 150 | 120 → 150 | 120 → 150 | 120 → 150 | 120 → 150 |
| time (min) | 161 | 158 | 173 | 185 | 205 |
| KOH[2] wt. (gms) | 104.0<br>(0.341%) | 115.0<br>(0.333%) | 107.0<br>(0.338%) | 119.0<br>(0.338%) | 102.0<br>(0.335%) |
| PO2 Feed[3] | | | | | |
| temp (° C.) | 150 | 150 | 150 | 150 | 150 |
| Wt. (gms) | 8075.8 | 8980.6 | 7048.0 | 6853.2 | 7238.9 |
| post-reaction (° C.) | 150 | 150 | 150 | 150 | 150 |
| time (min) | 239 | 232 | 208 | 191 | 217 |
| Total cycle time (min) | 400 | 390 | 381 | 376 | 422 |
| Lactic acid[4] wt. (gms) | 95.0 | 104.9 | 107.0 | 109.0 | 102.0 |
| I-1076[5] wt. (gms) | 5.5 | 6.1 | 6.0 | 6.4 | 5.5 |
| OH#[6] (mg KOH/gm) | 397.4 | 380.9 | 404.7 | 412.1 | 401.3 |
| Viscosity[7] (mPas) | 12167 | 11150 | 30750 | 55400 | 21450 |
| Free TDA[8] (ppm) | 3296 | 3757 | 1831 | 2160 | 2600 |

(a) a first alkoxylation step comprising reacting an alkylene oxide consisting essentially of propylene oxide with a starter consisting essentially of aromatic diamine at a molar ratio of propylene oxide to aromatic diamine of 1.4:1 to 2.0:1 to form an alkoxylated product; and (b) a second alkoxylation step comprising reacting an alkylene oxide consisting essentially of propylene oxide with the alkoxylated product, in the presence of an added catalyst, until the ratio of total moles of propylene oxide added in the process to the moles of aromatic diamine added in the process is 4:1 to 9:1.

2. The process of claim 1, wherein the polyether polyol has a viscosity at 25° C. of 10,000 to 30,000 mPas.

3. The process of claim 2, wherein the polyether polyol has a measured hydroxyl number of 350 to 450 mg KOH/g.

4. The process of claim 1, wherein the polyether polyol has a free aromatic amine content of no more than 1500 ppm.

5. The process of claim 1, wherein the aromatic diamine starter is used in an amount of at least 98% by weight, based on the total weight of starter used to produce the polyether polyol.

6. The process of claim 5, wherein propylene oxide is used in an amount of at least 98% by weight, based on the total weight of alkylene oxide used to produce the polyether polyol.

7. The process of claim 1, wherein, in the first alkoxylation step, the alkylene oxide consisting essentially of propylene oxide and starter consisting essentially of aromatic diamine are reacted at a molar ratio of propylene oxide to aromatic diamine of 1.5 to 1.8.

8. The process of claim 1, wherein the second alkoxylation step is conducted until the ratio of the total moles of propylene oxide added in the process to the moles of aromatic diamine added in the process is 6:1 to 8:1.

9. The process of claim 1, wherein the second alkoxylation step is at least partially carried out at a temperature that is at least 20° C. higher than a temperature at which the first alkoxylation step is conducted.

10. The process of claim 9, wherein the second alkoxylation step is conducted during or throughout propylene oxide addition at temperature that is within 20° C. of a temperature at which the first alkoxylation step is conducted and then the temperature is increased during propylene oxide addition or during a post-reaction period after propylene oxide addition.

11. The process of claim 1, wherein the second alkoxylation step is completed in no more than 6 hours.

12. A process for producing a polyether polyol having a measured OH number of 300 to 500 mg KOH/g comprising:

(a) a first alkoxylation step comprising reacting an alkylene oxide consisting essentially of propylene oxide with a starter consisting essentially of aromatic diamine at a first temperature and at a molar ratio of propylene oxide to aromatic diamine of 1.4:1 to 2.0:1 to form an alkoxylated product; and (b) a second alkoxylation step comprising reacting an alkylene oxide consisting essentially of propylene oxide with the alkoxylated product, in the presence of an added catalyst, until the ratio of total moles of propylene oxide added in the process to the moles of aromatic diamine added in the process is 4:1 to 9:1, wherein the second alkoxylation step comprises:

(i) a first portion conducted at a temperature within 20° C. of the first temperature; and (ii) a second portion conducted at a temperature at least 20° C. higher than the first temperature.

13. The process of claim 12, wherein the polyether polyol has a viscosity at 25° C. of 10,000 to 30,000 mPas.

14. The process of claim 13, wherein the polyether polyol has a measured hydroxyl number of 350 to 450 mg KOH/g.

15. The process of claim 12, wherein the polyether polyol has a free aromatic amine content of no more than 1500 ppm.

16. The process of claim 12, wherein the aromatic diamine starter is used in an amount of at least 98% by weight, based on the total weight of starter used to produce the polyether polyol.

17. The process of claim 16, wherein propylene oxide is used in an amount of at least 98% by weight, based on the total weight of alkylene oxide used to produce the polyether polyol.

18. The process of claim 12, wherein, in the first alkoxylation step, the alkylene oxide consisting essentially of propylene oxide and starter consisting essentially of aromatic diamine are reacted at a molar ratio of propylene oxide to aromatic diamine of 1.5 to 1.8.

19. The process of claim 12, wherein the second alkoxylation step is conducted until the ratio of the total moles of propylene oxide added in the process to the moles of aromatic diamine added in the process is 6:1 to 8:1.

20. The process of claim 12, wherein the second alkoxylation step is conducted during or throughout propylene oxide addition at temperature that is within 20° C. of a temperature at which the first alkoxylation step is conducted and then the temperature is increased during propylene oxide addition or during a post-reaction period after propylene oxide addition.

* * * * *